US 6,965,928 B1

(12) United States Patent
Cox et al.

(10) Patent No.: US 6,965,928 B1
(45) Date of Patent: Nov. 15, 2005

(54) SYSTEM AND METHOD FOR REMOTE MAINTENANCE OF HANDHELD COMPUTERS

(75) Inventors: Brian R. Cox, Aloha, OR (US);
Brandt Haagensen, Portland, OR (US);
Do Kim, Portland, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 869 days.

(21) Appl. No.: 09/802,452

(22) Filed: Mar. 9, 2001

(Under 37 CFR 1.47)

(51) Int. Cl.[7] .............................................. G06F 15/177
(52) U.S. Cl. ........................ 709/220; 709/221; 709/222; 709/219; 709/217; 709/203; 717/168
(58) Field of Search ................................. 709/220, 221, 709/217, 219, 203, 211; 717/168, 171

(56) References Cited

U.S. PATENT DOCUMENTS

| | | | |
|---|---|---|---|
| 4,714,992 A | | 12/1987 | Gladney et al. ............ 364/200 |
| 5,410,326 A | * | 4/1995 | Goldstein .................... 348/734 |
| 5,627,977 A | * | 5/1997 | Hickey et al. .............. 345/746 |
| 5,666,530 A | * | 9/1997 | Clark et al. ................. 707/201 |
| 5,802,277 A | * | 9/1998 | Cowlard ..................... 713/200 |
| 5,857,201 A | * | 1/1999 | Wright et al. ........... 707/104.1 |
| 5,889,943 A | * | 3/1999 | Ji et al. ....................... 713/201 |
| 5,928,329 A | * | 7/1999 | Clark et al. ................. 709/227 |
| 5,948,104 A | | 9/1999 | Gluck et al. ................ 713/200 |
| 5,951,698 A | * | 9/1999 | Chen et al. ................... 714/38 |
| 6,006,274 A | * | 12/1999 | Hawkins et al. ............ 709/248 |
| 6,052,531 A | | 4/2000 | Waldin, Jr. et al. ......... 395/712 |
| 6,119,165 A | | 9/2000 | Li et al. ...................... 709/229 |
| 6,151,643 A | * | 11/2000 | Cheng et al. ................. 710/36 |
| 6,167,407 A | | 12/2000 | Nachenberg et al. ....... 707/203 |
| 6,212,635 B1 | * | 4/2001 | Reardon ..................... 713/165 |
| 6,279,113 B1 | * | 8/2001 | Vaidya ........................ 713/201 |
| 6,292,833 B1 | * | 9/2001 | Liao et al. ................... 709/229 |
| 6,324,693 B1 | * | 11/2001 | Brodersen et al. .......... 717/177 |

(Continued)

FOREIGN PATENT DOCUMENTS

WO    WO 01/73523 A2 * 10/2001

OTHER PUBLICATIONS

Woffenden, C., "Antivirus Vendors prepare Wap Defences", http://vnunet.com/News/106797.*
Anti–Virus: For a program & virus–free file transfer utility. (For a Inc.'s SafeGuard and SafeLink anti–virus and virus–free file–transfer porgrams), Edge: Work–Group Computing Report, v2, n58, p12(1), Jul. 1, 1991.*
Office Action mailed Mar. 31, 2004 in U.S. Appl. No. 09/534,957 which was filed Mar. 24, 2000.
Office Action mailed Mar. 2, 2004 in U.S. Appl. No. 09/534,957 which was filed Mar. 24, 2000.
Office Action mailed Dec. 3, 2003 in U.S. Appl. No. 09/534,957 which was filed Mar. 24, 2000.

*Primary Examiner*—Dung C. Dinh
*Assistant Examiner*—Dohm Chankong
(74) *Attorney, Agent, or Firm*—Zilka-Kotab, PC; Christopher J. Hamaty

(57) ABSTRACT

A method for maintaining handheld computers at a location remote from a home maintenance node containing a maintenance database for at least one of the handheld computers. The method comprising connecting one of the handheld computers to a maintenance node and detecting whether the maintenance node is the home maintenance node for the handheld computer. If the connected maintenance node is not the home maintenance node, the home maintenance node for the handheld computer is located and a maintenance session is opened between the handheld computer and the home maintenance node. The method further includes performing maintenance on the handheld computer.

27 Claims, 8 Drawing Sheets

U.S. PATENT DOCUMENTS

| | | | |
|---|---|---|---|
| 6,327,579 B1 * | 12/2001 | Crawford | 705/400 |
| 6,338,141 B1 * | 1/2002 | Wells | 713/200 |
| 6,381,694 B1 * | 4/2002 | Yen | 713/2 |
| 6,397,335 B1 * | 5/2002 | Franczek et al. | 713/200 |
| 6,401,210 B1 * | 6/2002 | Templeton | 713/200 |
| 6,421,733 B1 * | 7/2002 | Tso et al. | 709/246 |
| 6,457,062 B1 * | 9/2002 | Pivowar et al. | 709/248 |
| 6,470,332 B1 * | 10/2002 | Weschler | 707/3 |
| 6,496,979 B1 * | 12/2002 | Chen et al. | 717/178 |
| 6,647,499 B1 * | 11/2003 | Morcom | 713/300 |
| 6,678,727 B1 * | 1/2004 | Lee et al. | 709/221 |
| 6,742,025 B2 * | 5/2004 | Jennery et al. | 709/220 |
| 2001/0005889 A1 * | 6/2001 | Albrecht | 713/201 |
| 2001/0011308 A1 * | 8/2001 | Clark et al. | 710/20 |
| 2002/0112041 A1 * | 8/2002 | Viscount et al. | 709/223 |

* cited by examiner

SYSTEM AND METHOD FOR REMOTE MAINTENANCE OF HANDHELD COMPUTERS

BACKGROUND OF THE INVENTION

The present invention relates generally to the maintenance of handheld computers, and more specifically, to a method and system for remotely maintaining handheld computers.

Handheld computers include devices such as personal digital assistants (PDAs) and smart phones which are generally small enough to be held in the hand of a user. These devices typically include applications such as an address book, daily organizer, and electronic notepad. Examples of handheld computers include 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Psion's REVO, NETBOOK, and WORKABOUT, NeoPoint's 1000, and Qualcomrnm's PDQ. Handheld computers are widely operated in an environment where software and data records are shared between users. For example, software may be transferred between two handheld computers or downloaded from a personal computer system to a handheld computer. Handheld computers may also receive e-mail messages and other data from another handheld computer via an infrared port or from a personal computer through a modem, serial line connection, or network. In this shared environment, computer viruses can spread among handheld computers as rapidly as they do with personal computer systems.

A computer virus is generally a manmade destructive computer program or code that is loaded onto a computer system without the knowledge of the user. The computer virus is often a self-replicating program containing code that explicitly copies itself and can infect other programs by modifying them or their environment. The term virus generally refers to any destructible or harmful program or code that attempts to hide its possibly malicious function or tries to spread onto as many computers as possible. Even a simple virus can be dangerous as the virus can quickly use a large portion of the available memory and possibly bring down the computer.

Most of the antivirus software available today, such as conventional device resident antivirus scanners, require a large amount of memory. For example, typical scanner software requires approximately 16 MB RAM. While this memory is typically insignificant on personal computers (e.g., desktop or laptop computers) handheld computers often include no more than 2 MB dynamic memory and storage and are not equipped to handle such large memory requirements. Furthermore, handheld computers are generally too slow to provide reasonable virus scanning performance.

Moreover, many handheld computers are not equipped to provide direct network access, and those that can connect with a network, utilize a connection that is either too slow or expensive to be practical for the sizable transfer of data, such as updates to handheld computer applications.

Thus, maintenance to handheld computers, which includes checking the computer for viruses and updating programs installed on the computer, is typically performed by placing the handheld computer in a cradle coupled to the user's personal computer and using the computer to scan files copied from the handheld computer and update software installed on the computer. As previously discussed, it is important to check the handheld computer for viruses often to prevent loss or destruction of files stored on the computer. However, the user of the handheld computer may not have access to his personal computer at all times. Also, it is often desirable to update the handheld computer while at a location remote from the user's own personal computer.

Furthermore, large companies often want to install the same applications on all of the employees' handheld computers, delete unauthorized software, or insure that all computers utilize the same version software. This is easily done on networked computers, however, the company typically has little control over what the employees have installed on their handheld computers.

There is, therefore, a need for a method and system for maintaining a handheld computer remotely and maintaining a plurality of handheld computers from a central location.

SUMMARY OF THE INVENTION

A method and system for maintaining handheld computers at a location remote from a home maintenance node containing a maintenance database for at least one of the handheld computers are disclosed. The method generally 5 comprises connecting one of the handheld computers to a maintenance node and detecting whether the maintenance node is the home maintenance node for the handheld computer. If the connected maintenance node is not the home maintenance node, the home maintenance node for the handheld computer is located and a maintenance session is opened between the handheld computer and the home maintenance node. The method further includes performing maintenance on the handheld computer.

There may be a one-to-one relationship between the handheld computers and the maintenance nodes such that each of the maintenance nodes represent the home maintenance node for only one handheld computer or a central maintenance node that is the home maintenance node for all of the handheld computers may be used.

Performing maintenance at the handheld computer may include scanning data stored on the handheld computer for viruses, synchronizing data between the handheld computer and the home maintenance node, performing diagnostics on the handheld computer, or updating software stored on the handheld computer, for example.

A system of the present invention generally comprises a maintenance database stored on the home maintenance node and associated with at least one of the handheld computers and a maintenance manager installed on each of the maintenance nodes and operable to detect whether the maintenance node is the home maintenance node for the handheld computer connected to the maintenance node. The maintenance manager is further configured to locate the home maintenance node for the handheld computer if the maintenance node is not the home maintenance node, open a maintenance session across the network between the located home maintenance node and the connected handheld computer, and perform a maintenance operation using the maintenance database stored on the home maintenance node.

In another aspect of the invention, a computer program product for maintaining handheld computers at a location remote from a home maintenance node containing a maintenance database for at least one of the handheld computers generally comprises computer code that creates a communication link between one of the handheld computers and a maintenance node; computer code that detects whether the maintenance node is the home maintenance node for the handheld computer; computer code that locates the home maintenance node for the handheld computer if the connected maintenance node is not the home maintenance node; computer code that opens a maintenance session between the handheld computer and the home maintenance node; computer code that performs maintenance on the handheld computer; and a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
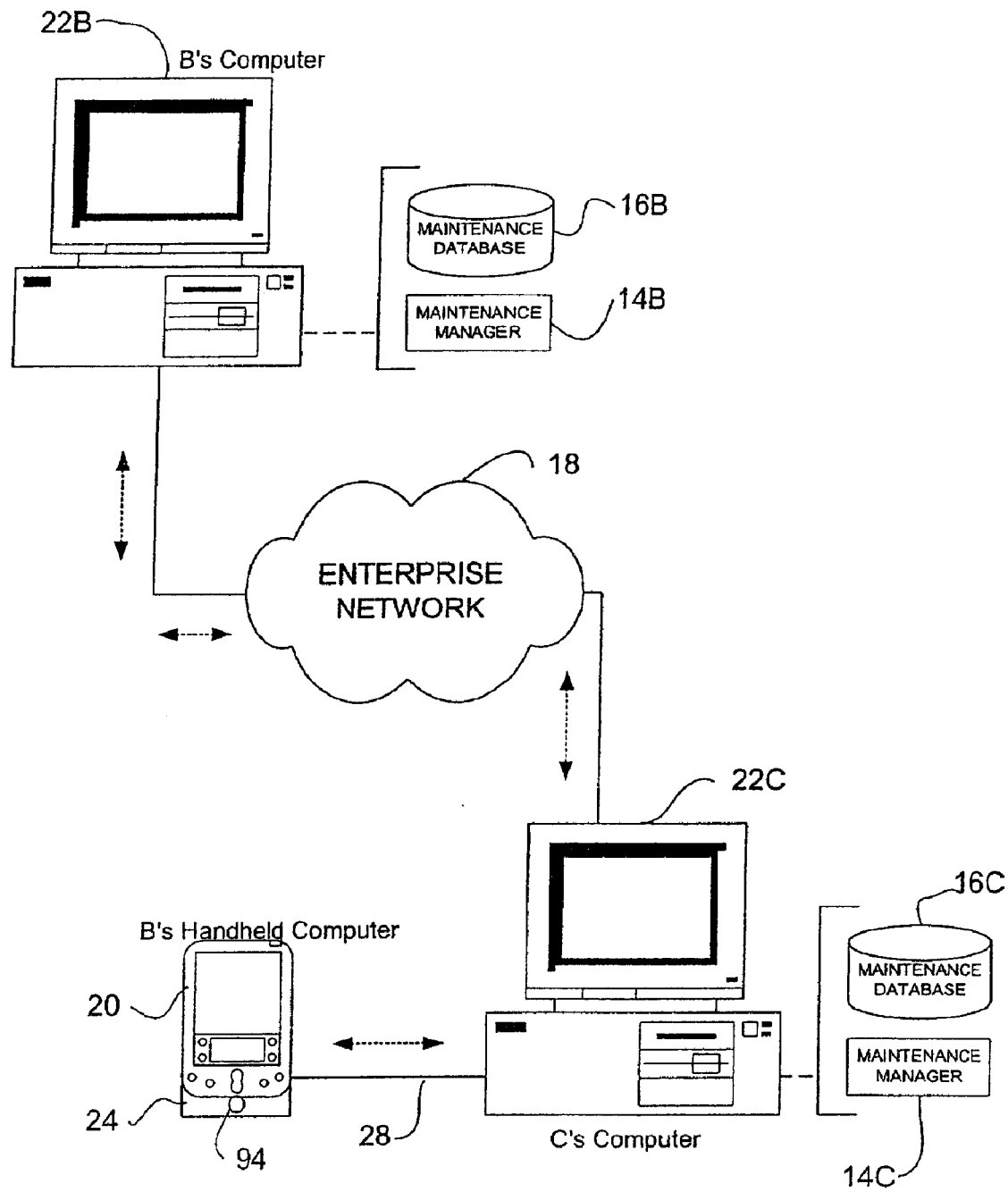
FIG. 1 is a schematic illustrating a system of the present invention for maintaining a handheld computer with a remote personal computer.

Referring now to the drawings, and first to FIG. 1, a system for maintaining a handheld computer 20 at a remote location is shown. The system allows a user to maintain (e.g., update, perform diagnostics, repair, scan for viruses, reconfigure) the handheld computer 20 over a network connection. Software (maintenance manager) 14 used to maintain the handheld computer and a maintenance database 16 which contains information on the user's handheld computer is contained on the user's personal computer (home maintenance node) 22. The maintenance database 16 contains, for example, a personal calendar, contacts, tasks, list of software and version installed on the handheld computer 20, and a history of diagnostics and repairs for the handheld computer. Each handheld computer 20 is associated with at least one personal computer 22 (home maintenance node) that contains its maintenance database 16. The personal computer 22 may include a maintenance database 16 for more than one handheld computer 20.

The home maintenance nodes 22 for each of the handheld computers 20 are connected through a network 18, such as a company's enterprise network. The network 18 may be a Local Area Network (LAN) or a Wide Area Network (WAN), for example. This allows a user to maintain his handheld computer 20 when he is at a location remote from his own personal computer 22. For example, user B has his maintenance database 16B located on maintenance node 22B. User B is at user C's office and wants to update his handheld computer 20. Instead of walking back to his own office, user B can access his maintenance database 16B from user C's personal computer 22C. User B establishes a connection between his handheld computer 20 and user C's personal computer 22C by placing his computer in a cradle 24 connected to C's personal computer. The maintenance manager 14C on C's computer 22C detects that the handheld computer 20 located in the cradle 24 is not C's handheld computer and connects to the network 18 to search for B's home maintenance node 22B. Once B's home maintenance node 22B is found, B's handheld computer 20 is updated from his own database 16B. The system thus provides the user with a fast and secure method for updating his handheld computer 20 at any location coupled to the enterprise network 18.

The following provides a brief description of an exemplary handheld computer 20 and personal computer 22 that may be used to implement the present invention. A description of exemplary systems that may be used to update software installed on the handheld computer 20 and check the computer for viruses are also provided.

Figure 2:
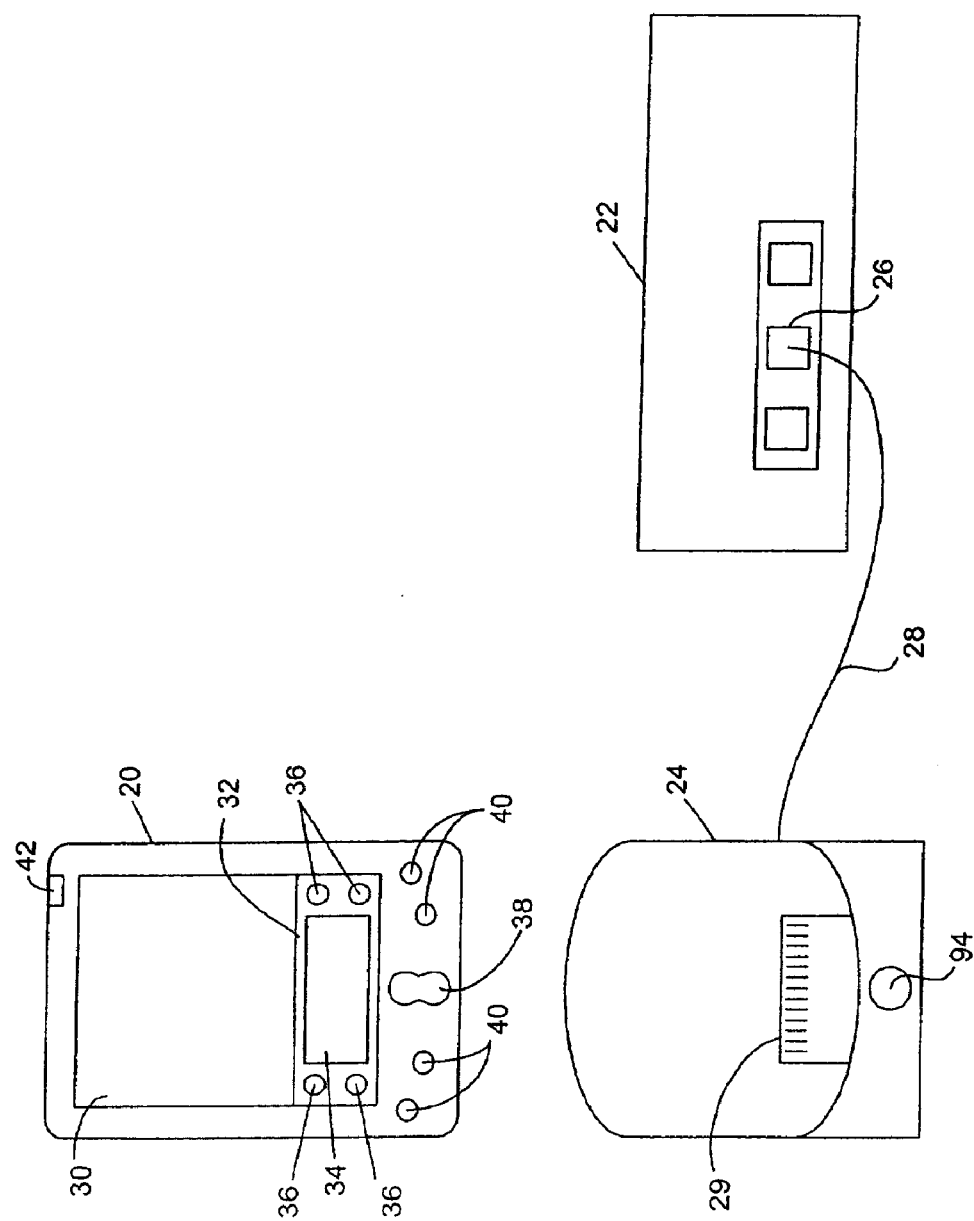
FIG. 2 is a schematic of a handheld computer and a personal computer equipped with a cradle for synchronizing with the handheld computer.

FIG. 2 illustrates handheld computer 20 and personal computer 22 equipped with a cradle 24 for communication with the handheld computer. The cradle 24 is attached to a serial port 26 of the personal computer 22 and is used to provide a communication link 28 (e.g., serial data line, USB connection, parallel (printer port) connection, FireWire connection, PCMCIA connection, or any other type of data communication line) between the handheld computer 20 and the personal computer 22. The serial communication line 28 extends from the serial port 26 and terminates at a serial connector 29 on the cradle 24. A matching serial connector (not shown) on the handheld computer 20 connects the handheld computer to the personal computer 22.

The handheld computer 20 is generally a mobile computing device that is sufficiently compact such that it can be held in a users hands and easily carried by the user. Examples of handheld computers include the following personal digital assistants (PDAs): 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Franklin's REX, Symbol's SPT and PPT, and Psion's REVO, NETBOOK, and WORK- ABOUT. Handheld computers also include "smart" phones such as those manufactured by Nokia, Ericson, NeoPoint, and Qualconim. The term handheld computer, as used herein, generally includes any compact computing device operable to transfer executable code between itself and another computer. The term handheld computer also includes devices which may be connected to a larger device, such as Clarion's AUTO PC, which is a personal assistant that can be placed in the dashboard of an automobile. Many of these handheld computers operate on a PalmOS platform, or use a Windows CE or EPOC operating system. It is to be understood that the devices and operating systems listed above are merely provided as examples and that the invention is not limited to use with these devices and systems.

FIG. 2 shows an exemplary handheld computer available from 3COM of Santa Clara, Calif., under the product name PALM V. Most of the surface area of the handheld computer 20 consists of a screen display area 30 which is used to display information to the user. The screen display area 30 is covered with a touch sensitive digitizer pad that can detect user interaction with a stylus or a finger. Below the display area 30 is a user input area 32 which is used to input text in a writing area 34 and interact with application buttons 36. Below the user input area 32 are mechanical scrolling button 38 and application buttons 40. A mechanical power button 42 is provided to turn the handheld computer 20 on and off. The application buttons 40 are used to execute applications such as an address book, calendar, To-Do list, or memo pad. It is to be understood that the handheld computer 20 may be different than shown and described herein without departing from the scope of the invention. For example, the handheld computer may include a miniaturized keyboard and display screen such as included in the Hewlett Packard JORNADA 680.

Figure 3:
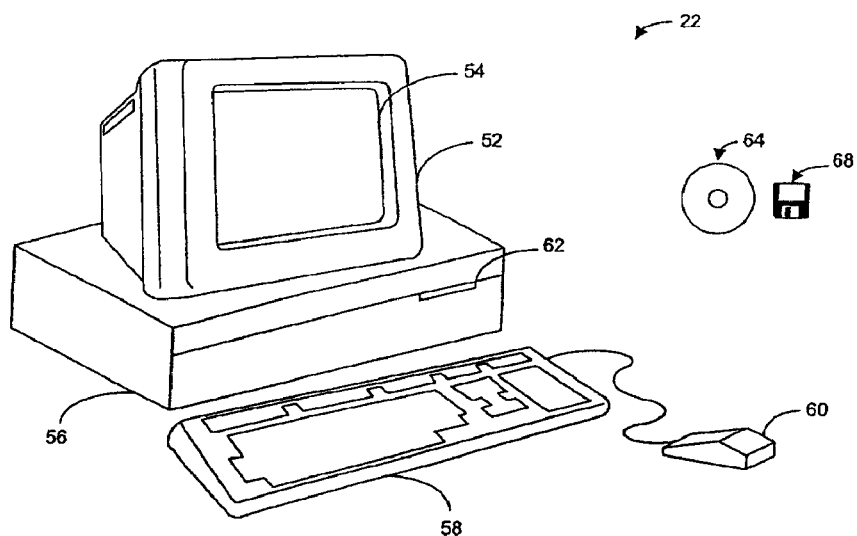
FIG. 3 is a schematic illustrating an example of a computer system that can be utilized to execute software of an embodiment of the invention.

The personal computer (computer system) 22 may be a stand-alone desktop computer, laptop computer, a mainframe computer, or any other type of computer. The personal computer 22 may be configured for use as a server or other networked computer. FIG. 3 illustrates an example of a computer system 22 that can communicate with the handheld computer 20 and be used to execute software of an embodiment of the invention. The computer system 22 includes a display 52, screen 54, cabinet 56, keyboard 58, and mouse 60, which may include one or more buttons for interacting with a GUI (Graphical User Interface). Cabinet 56 houses a CD-ROM drive 62, system memory 72 and fixed storage 74 (see FIG. 4) which can be utilized to store and retrieve software programs incorporating computer code that implements aspects of the invention, data for use with the invention, and the like. Although CD-ROM 64 and floppy disk 68 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 4:
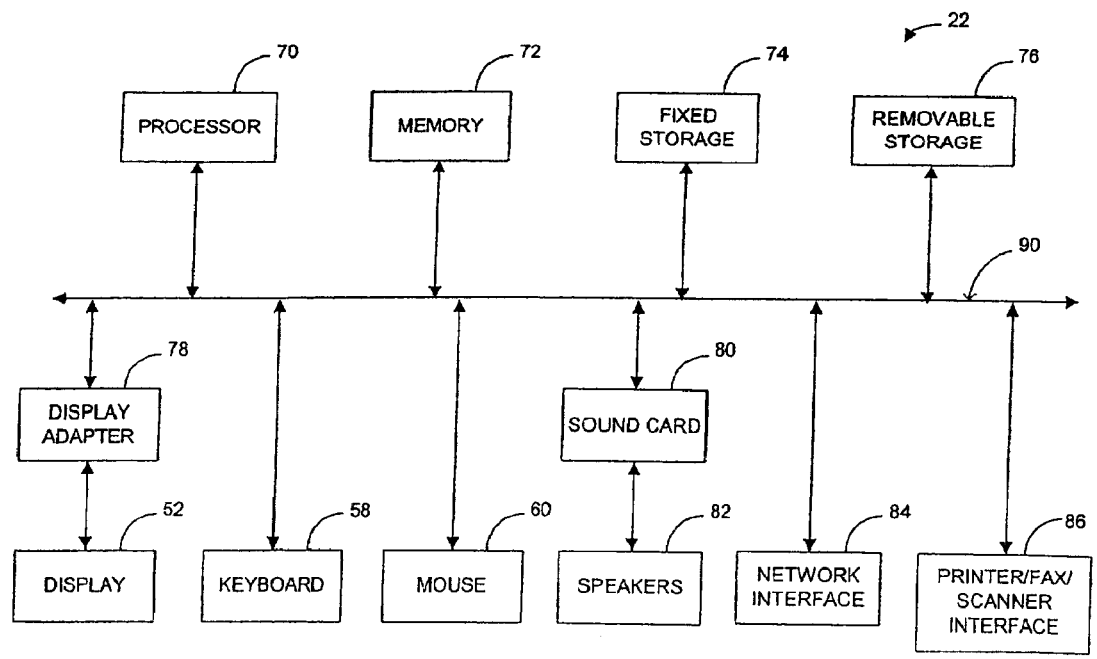
FIG. 4 is a system block diagram of the computer system of FIG. 3.

FIG. 4 shows a system block diagram of computer system 22 used to execute software of an embodiment of the invention. Computer system 22 further includes subsystems such as a central processor 70, system memory 72, fixed storage 74 (e.g., hard drive), removable storage 76 (e.g., CD-ROM drive), display adapter 78, sound card 80, transducers 82 (e.g., speakers, microphones, and the like), network interface 84, and printer/fax/scanner interface 86. Other computer systems suitable for use with the invention may include additional or fewer subsystems. For example, computer system 22 may include more than one processor 70 (i.e., a multi-processor system) or a cache memory.

The system bus architecture of computer system 22 is represented by arrows 90 in FIG. 4. However, these arrows are only illustrative of one possible interconnection scheme serving to link the subsystems. For example, a local bus could be utilized to connect the central processor 70 to the system memory 72 and display adapter 78. Computer system 22 shown in FIGS. 3 and 4 is one example of a computer system suitable for use with the invention. Other computer architectures having different configurations or subsystems may also be utilized.

The computer system 22 may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol). Servers capable of sending and receiving information over the Internet are also connected to the Internet. The servers may comprise a World Wide Web site having a variety of software updates for handheld computer programs or applications. The server may be associated with a particular software manufacturer, which stores and maintains versions of specific handheld computer applications, or the server may comprise a variety of different applications and update information. The client computer 22 may also be connected to the server through a LAN, WAN, or any other type of network.

The handheld computer 20 generally includes a suite of personal information management (PIM) applications such as an address book, daily organizer, To-Do list, and memo pad (FIG. 2). The handheld computer 20 allows a user to have at his fingertips the information contained within PIM applications (e.g., Microsoft Outlook, Palm Desktop) resident on the personal computer 22. In order to keep the information on the handheld computer 20 up to date with information on the personal computer 22 and to prevent having to enter the same information on both computers, information is synchronized between the handheld computer and the personal computer.

Synchronization is a process of merging two databases, one on the handheld computer 20 and one on the personal computer 22. In order to synchronize information between the handheld computer 20 and the personal computer 22, the handheld computer is placed in the cradle 24 and a synchronization button 94 is pressed (FIG. 2). Actuation of the synchronization button 94 causes a synchronization program on the handheld computer 20 to execute which in turn starts a corresponding synchronization program on the personal computer 22. The synchronization operation may also begin automatically when the handheld computer 20 is placed in the cradle 24. The handheld computer 20 preferably has a name assigned to it the fist time it is synchronized with the personal computer 22. Virus scanning of files, updating of software, or other maintenance may be performed in conjunction with the synchronization operation. The cradle 24 may also include a separate button for different maintenance operations.

Figure 5:
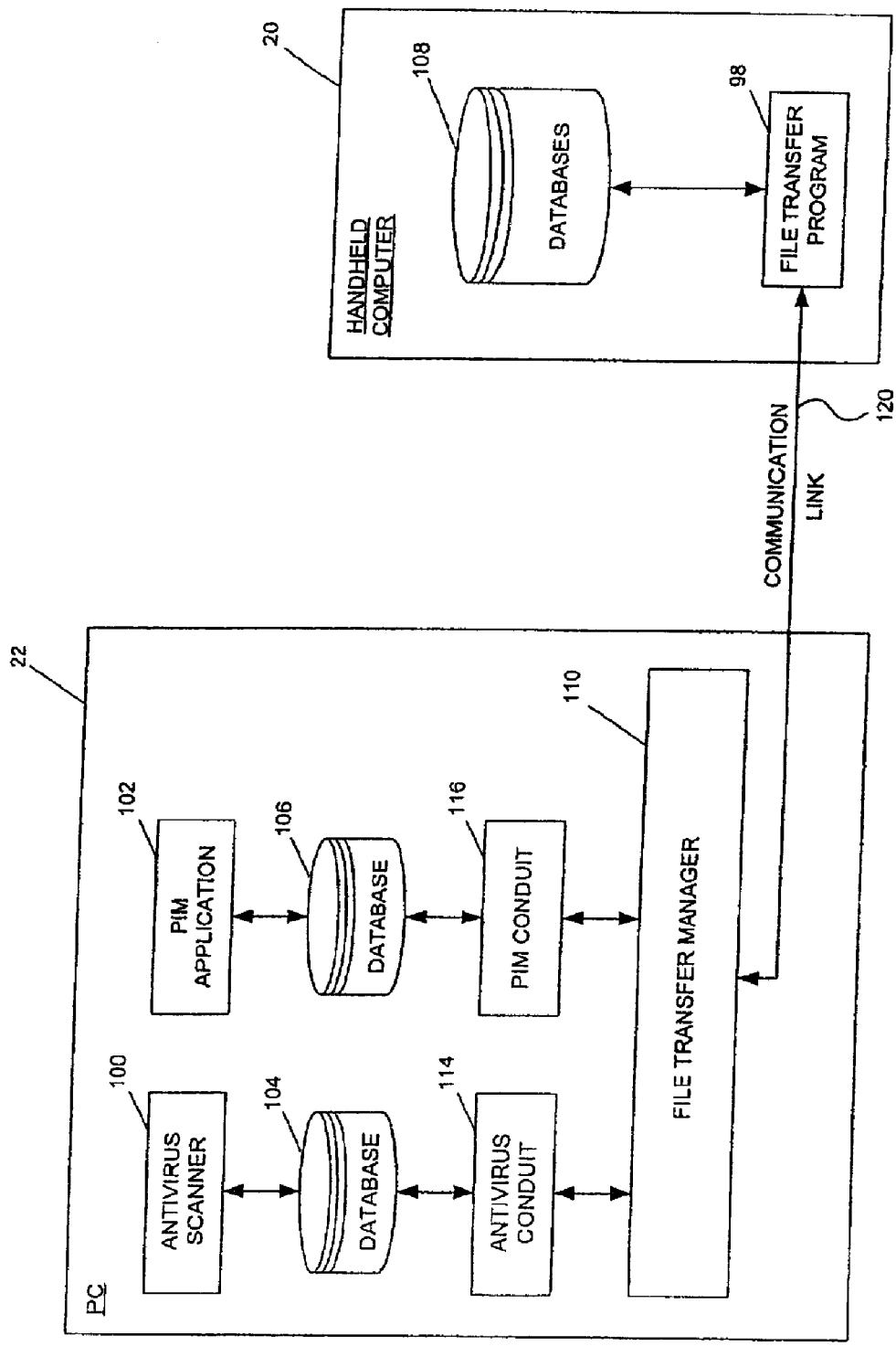
FIG. 5 is a block diagram illustrating a file transfer program on the handheld computer communicating with an antivirus scanner and a PIM application on the personal computer.

Once connected to the appropriate maintenance manager 14 and database 16, the handheld computer 20 can be checked for viruses by a system such as shown in FIG. 5. The system includes a file transfer program 98 on the handheld computer 20 communicating with an antivirus scanner 100 and PIM application 102 on the personal computer 22. The handheld computer 20 and personal computer 22 are in communication with one another through a communication link 120. As previously described, the communication link 120 may be a serial line, dial-up line, network, or wireless connection. The antivirus scanner 100 scans files downloaded into an antivirus database 104 and the PIM application 102 receives and sends data to PIM database 106. Data is typically stored on the handheld computer 20 in memory chunks called records, which are grouped into databases 108. The database 108 is analogous to a file except that data is broken down into multiple records instead of being stored in one contiguous chunk. Each database 108 includes database header and record information. A data manager keeps track of records using a record ID that is assigned by the operating system. Each data record may include a flag which identifies if the record is new, modified, or deleted. The handheld computer 20 and the personal computer 22 maintain a set of status flags for each of their corresponding data records. After each synchronization, all the data record status flags are cleared since the two systems have identical databases after the synchronization.

The personal computer 22 includes a file transfer program manager 110 which communicates with the file transfer program 98 within the handheld computer 20. On a personal computer using the PALM operating system, the file transfer manager is called a HOTSYNC manager. The manager 110 manages the synchronization and virus scanning process and calls on conduits to perform the actual data manipulation. Antivirus conduit 114 interfaces with the database 104 and antivirus scanner 100 to control the antivirus scanning. PIM conduit 116 controls synchronization with the PIM application 102. The conduits 114, 116 are dynamic link libraries (DLLs) that are called during a virus scan and synchronization operation, respectively. The conduits 114, 116 are responsible for reading and writing both the personal computer databases 104, 106 and the handheld computer databases 108 and for performing any data transformations or file value mappings required to accurately move data between the two systems.

The antivirus program may be an application such as McAfee's VSHIELD, ACTIVESHIELD, SCAN NOW or VIRUS SCAN program, or antivirus applications described in U.S. Pat. No. 6,029,256, issued Feb. 22, 2000 or U.S. patent application Ser. No., 09/001,611, filed Dec. 31, 1997, which are incorporated herein by reference, or any other suitable antivirus program. The antivirus program preferably contains an update agent which is resident in the background of the personal computer system 22 and polls for updates at a set interval. For example, the program may poll a server daily to check for new virus signature files or new scan engine libraries. Update component versions may be posted on an application server provider (ASP) page located on the Internet, which reports back whether there are newer versions of any of the listed components. This data may be displayed in a browser window which the user can log on to and download updated components. The handheld computer 20 may also receive an e-mail message informing the user that it is time to check the handheld computer for viruses or that new viruses have been discovered. The antivirus program may be installed on the personal computer by a disk or CD-ROM, or downloaded directly from the Internet, for example.

The maintenance manager 14 may also store system information about the handheld computer 20, which may be used for tracking changes made to the configuration of the handheld computer. For example, the user may be notified if suspicious or potentially harmful changes have been made to the configuration of the device.

The maintenance manager 14 is also configured to update software (e.g., applications, programs) resident on the handheld computer 20. The software may include applications such as address, date book, expense, mail, memo pad, operating system, to do list, or games, for example. The file transfer manager 110 is used to collect data from the handheld computer 20 to identify what software is installed on the handheld computer 20 and version of the software. This information may be stored in the maintenance database 16. As shown in FIG. 10, the file transfer manager 110 is in communication with an update conduit 220. The update conduit 220 is a dynamic link library that is used by an update program 224 to gather software information from the handheld computer 20. A database 222 may be connected to the update conduit 220 and update program 224 to provide a temporary storage area for the list of software and version identifiers downloaded from the handheld computer 20. The update program 224 is coupled to a server 226 for receiving software updates. The software updates may be a new updated version of a program or only a few lines of software code, for example. The personal computer 22 may be connected to the server 226 by way of an Internet service provider coupled to the Internet, and the server may comprise a World Wide Web site maintaining updated versions of applications.

Updated software may be obtained from the server 226 while the handheld computer 20 is in communication with the client computer 22, or the updates may be obtained from the server after the handheld computer is disconnected from the client computer and transferred to the handheld computer the next time it is in communication with the client computer.

Additional details of the virus scanning and update systems are disclosed in U.S. patent application Ser. No. 09/534,957, filed Mar. 24, 2000, which is incorporated herein by reference in its entirety. It is to be understood that the antivirus scanning of the handheld computer 20 or update of the software may be performed on an operating system different than the one described herein and the components of the file transfer programs, arrangement of program components, or antivirus scanner may be different than described herein, without departing from the scope of the invention.

The maintenance manager 14 resident on the personal computer 22 may perform additional functions, such as display advertisements or upgrade offers based on the applications a user has installed on his handheld computer 20 or personal computer 22. For example, if the handheld computer 20 reaches a low memory availability state, the user may be presented with an option to purchase memory upgrades or removable storage.

Figure 7:
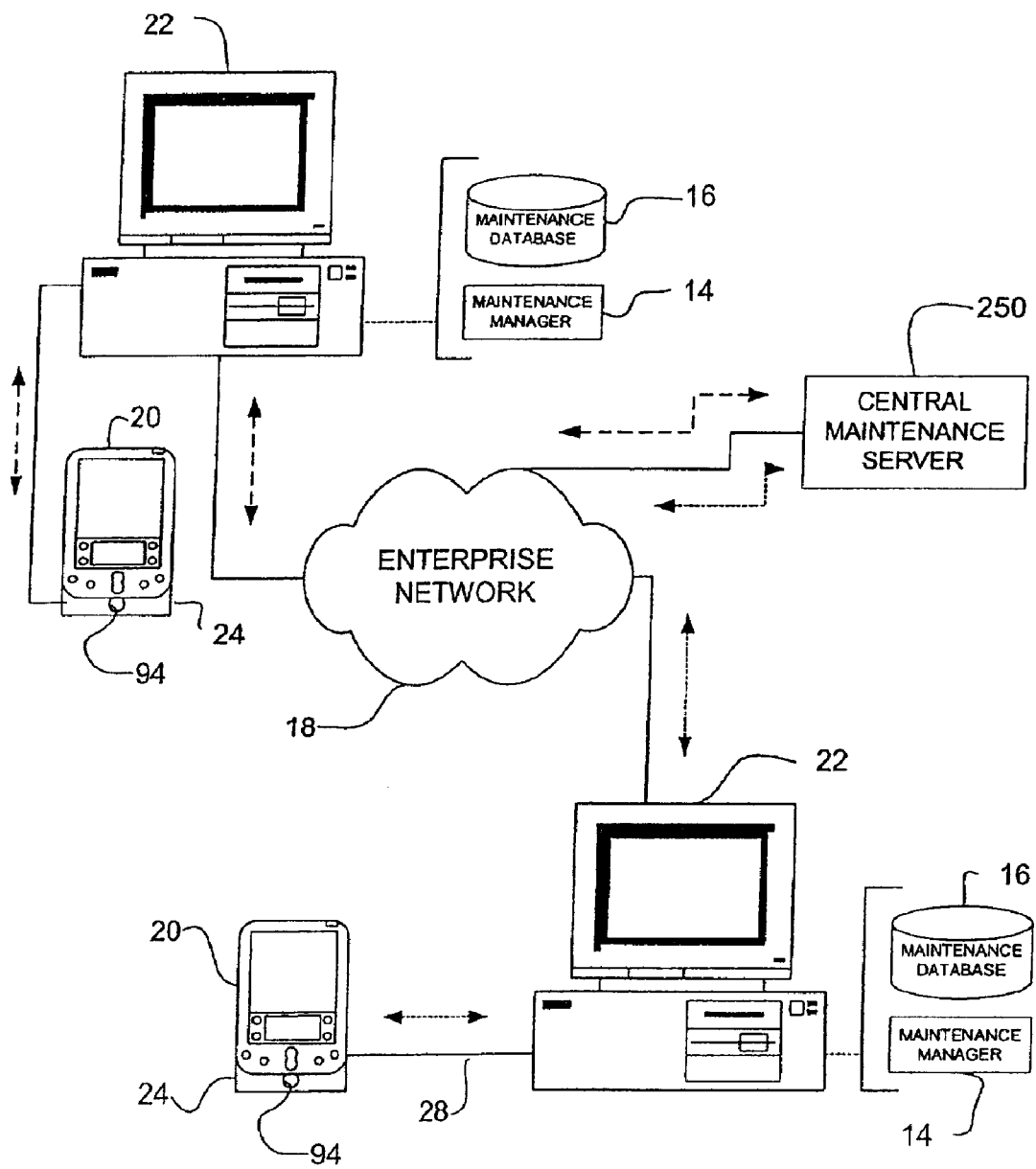
FIG. 7 is a schematic illustrating a second embodiment of the present invention for maintaining a handheld computer with a central maintenance node.
Figure 8:
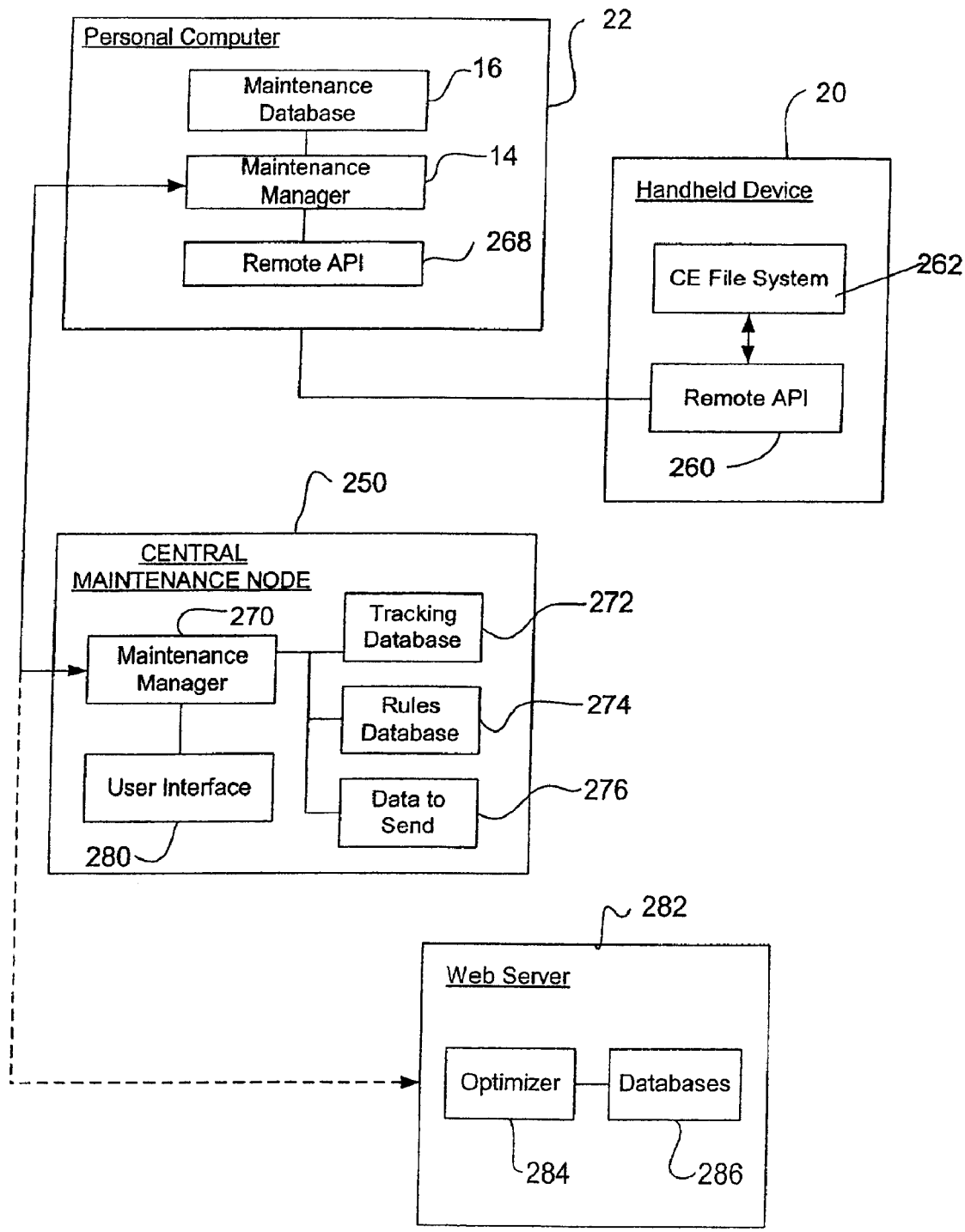
FIG. 8 is a block diagram illustrating details of the system of FIG. 7.

FIGS. 7 and 8 illustrate a second embodiment of the system of the present invention. The system shown in FIG. 7 provides for the maintenance of a plurality of handheld computers 20 at a central maintenance node 250 coupled to the enterprise network 18. This allows a company to monitor or control the configuration of all of its employees' handheld computers 20. The central server 250 can store configuration and inventory data for centralized tracking of hardware and software on all of the handheld computers 20 of its employees. The network 18 is connected to the central maintenance server 250 which may include databases for all of the handheld computers of users of the network. The maintenance databases may also be located on the home maintenance nodes 22.

FIG. 8 illustrates details of a system for use with a handheld device 20 having a Windows CE operating system. It is to be understood, however, that the system may also be used with a handheld computer having a PALM OS or other type of operating system. The handheld computer 20 includes a remote API 260 that is communication with a CE file system 262 stored on the handheld computer. The remote API 260 is used to interface with a remote API 268 located on the personal computer 22 when a connection is established between the handheld device 20 and personal computer. The remote API 268 of the personal computer 22 is in communication with the maintenance manger 14 which is coupled to the maintenance database 16.

The central maintenance node 250 includes a central maintenance manager 270 which has access to a tracking database 272, a rules database 274, and a database 276 containing information to be downloaded to the handheld computers 20. The central maintenance node 250 further includes a user interface 280 which allows a system administrator to configure and update the databases 272, 274, 276. The tracking database 272 contains information on problems found and actions taken on specific handheld computers 20 as well as configuration information and software versions contained on each computer. This information may be used by the systems administrator to determine the latest configuration of handheld computers 20 used by the employees and identify any recurring or wide spread problems. The rules database 274 is used to define preferred configurations of the handheld computers 20 and identify software that should not be installed on the computers. Database 276 includes data such as software license information that is to be downloaded to the handheld computers 20. The central maintenance node 250 may also be connected to a Web server 282 on the Internet to allow for direct access of software upgrades, diagnostic tools, and other applications. As shown in FIG. 8, the Web server 282 may include an optimizer application 284 and a database 286 containing, for example, software upgrades and diagnostic information.

The maintenance manager 14 allows for diagnostics to be run without the need to install additional software on the handheld computer 20. Remote access API's 268 may be used to diagnose and repair problems on the handheld computer. For example, the Windows CE platform allows the file system and registry of the handheld device 20 to be accessed remotely. The maintenance manager 14 uses remote API calls to examine shortcut files on the Windows CE device and check each shortcut to determine whether the file the shortcut points at is present on the device. The registry may also be scanned to determine whether device drivers are installed and configured correctly. The maintenance manager 14 may also identify temporary files that the user can safely delete to save space on the handheld computer 20.

Figure 9:
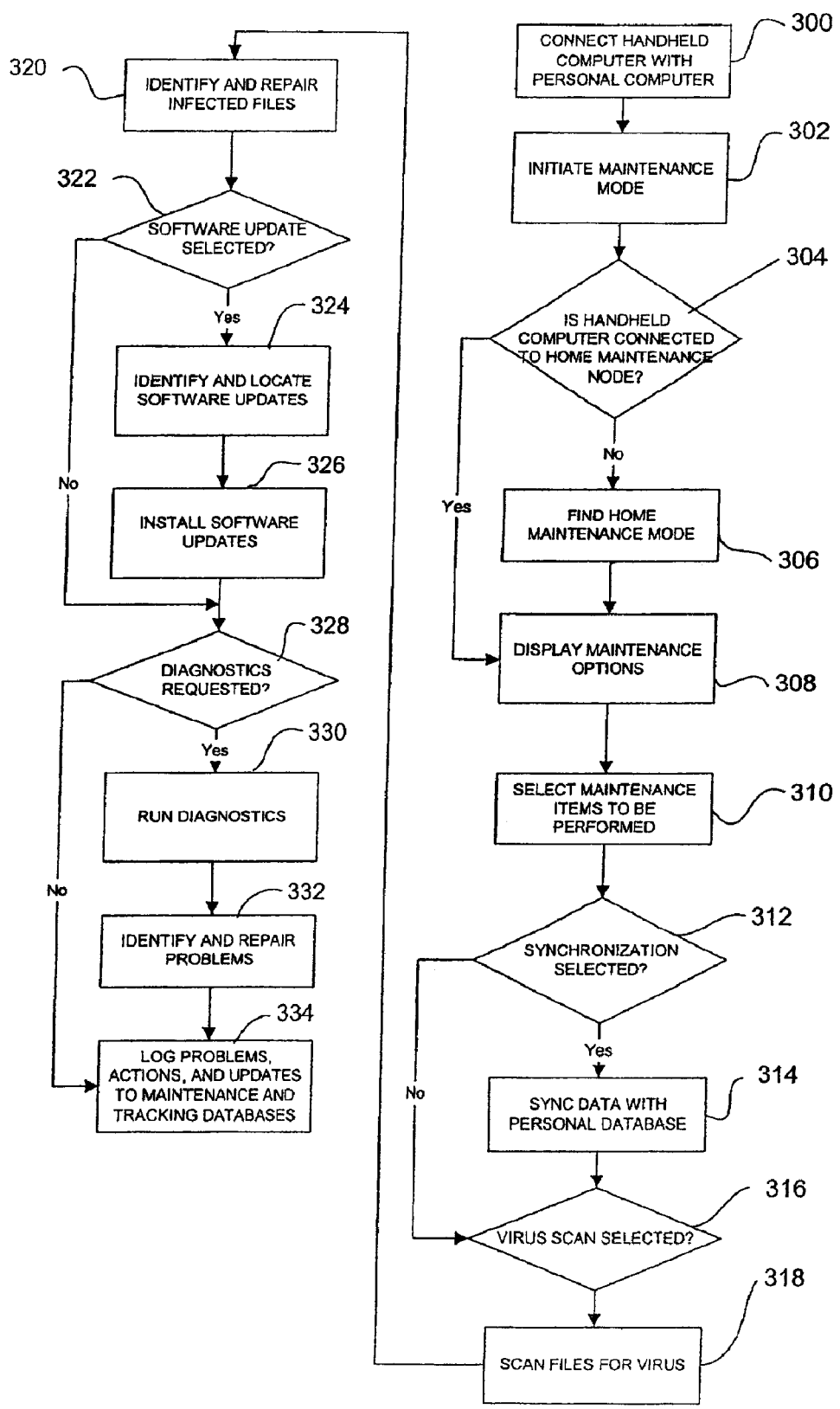
FIG. 9 is a flowchart illustrating a process of the present invention for remote maintenance of a handheld computer.

FIG. 9 is a flowchart illustrating a process for maintaining the handheld computer 20 at a location remote from the home maintenance node 22 or central maintenance node 250. The handheld computer 20 is first put into communication with the personal computer 22 to create a communication link between the handheld computer and the personal computer at step 300 (FIGS. 2 and 9). As previously described, this may involve placing the handheld computer 20 into the cradle 24 attached to personal computer 22. The user starts the maintenance operation at step 302 by pushing the synchronization button 94 or selecting a maintenance menu option on the handheld computer 20. The maintenance manager 14 installed on the personal computer 22 that is in communication with the handheld device 20 first checks to see if the personal computer is the home maintenance node for the handheld computer (step 304) (FIGS. 1 and 9). If it is not the home maintenance node assigned to the handheld computer 20, the computer connects to the network 18 and searches for the handheld computer's home maintenance node or a central maintenance node 250 (step 306). The user may select the maintenance operations that they want performed on their handheld computer 20 from a list displayed on the screen of the personal computer (steps 308 and 310). The list may include, for example, synchronization of data, scanning for viruses, updating software, and other diagnostics. If a central maintenance server 250 is used, the user may not have a choice or may be limited to the maintenance he can perform. Also, the central maintenance server 250 may perform additional maintenance on the user's handheld computer without asking permission from the user or notifying the user that it is being performed. For example, the central maintenance server 250 may automatically update software, delete unauthorized applications such as games, or perform additional diagnostics.

If synchronization is selected, the PIM conduit 116 compares each handheld computer record against the corresponding personal computer record and decides how to proceed with the information (FIGS. 5 and 9) (steps 312 and 314). The records may be updated, copied, or deleted in one or both of the databases 106, 108. After synchronization is complete, the antivirus conduit will run the antivirus scan if selected (steps 316 and 318).

The antivirus conduit opens up database 104 on the maintenance node and databases 108 on the handheld computer (FIGS. 5 and 9). The conduit 114 reads the records from the handheld database 108 and writes the records into database 104. After data is read and written to a file, the antivirus scanner scans the file. If an infected file is found, a dialog box may be displayed to ask the user whether he wants to delete, clean, or quarantine the file, or ignore the virus. If the user elects to clean the file, the temporary file on the personal computer 22 is cleaned, the cleaned data is written back to the handheld computer 20, and the original data record is deleted from the handheld computer (step 320). If the user elects to delete the file, the file is simply deleted from the handheld computer. The user may also elect to quarantine the file, in which case the file is moved to a quarantine location within the personal computer 22 and the file is deleted from the handheld computer 20. Alternatively, the scanner can first determine whether the target of the virus is the personal computer 22 or the handheld computer 20 and quarantine the virus on whichever device the virus will not execute on. If the virus can execute on both platforms, or neither, the virus is quarantined on the personal computer side. If the user chooses to ignore the virus, the scanner will ignore the infected file and continue to scan the remaining files, if there are files left to scan. After all files have been scanned, the antivirus conduit 114 deletes the temporary copy of the files on the personal computer 22 and closes the handheld computer databases 108. Control is then returned to the file transfer program manager 110 so that the manager can update software if selected (steps 322 and 324).

Figure 6:
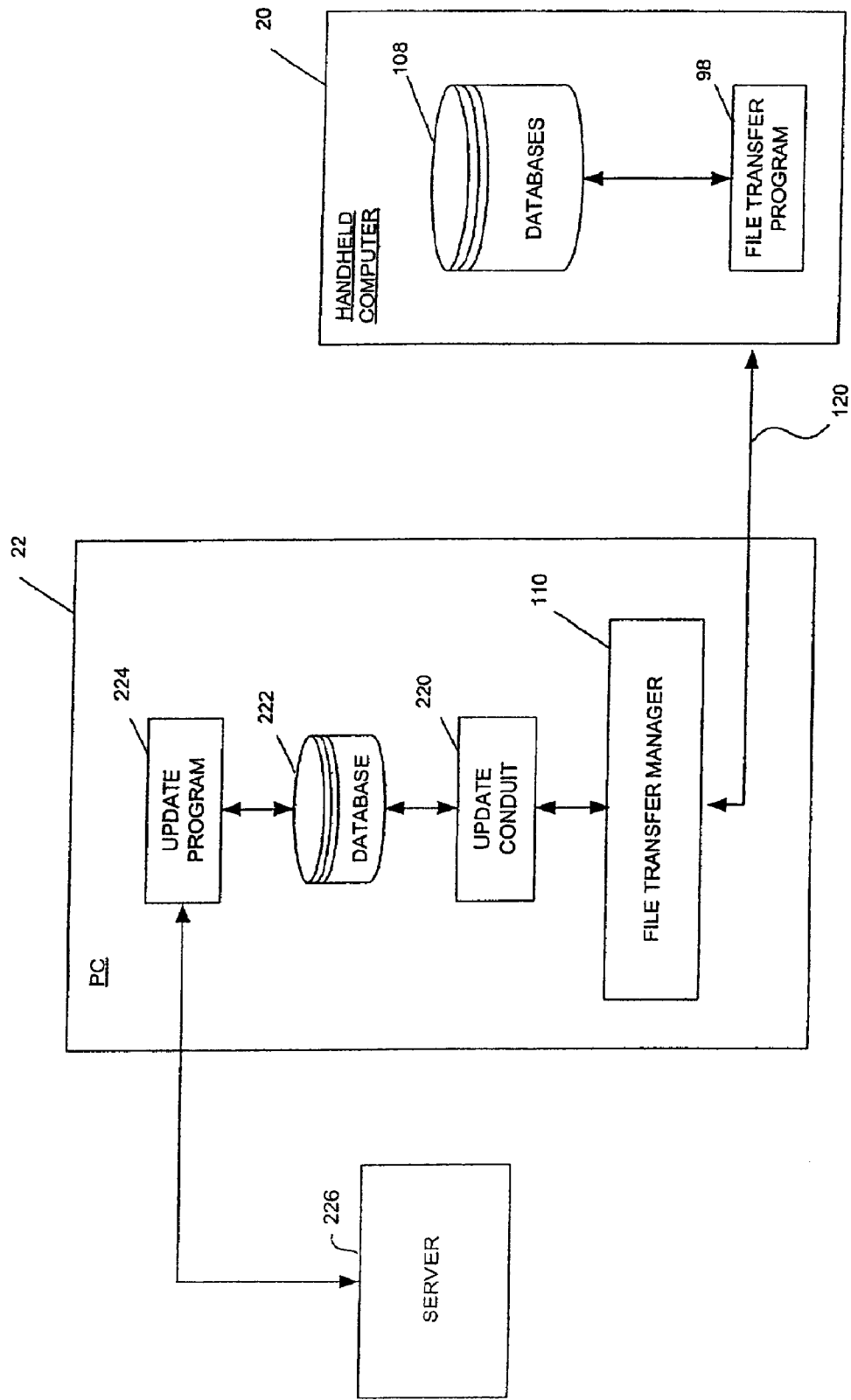
FIG. 6 is a block diagram illustrating an update program on the personal computer communicating with a server and a file transfer program on the handheld computer.

The update conduit first instructs the file transfer manager 110 to collect software information from the handheld computer 20. The update conduit 220 creates a list of applications installed on the handheld computer 20 and version information for each application in database 222 (FIGS. 6 and 9). A menu box may be displayed to the user to determine which applications the user wants to update and whether he wants to update the applications now or at a later time. If the user chooses to perform the update at a later time, the update program 224 will store application and version information from the handheld computer 20 and close the communication link 120. If required, other conduits may be run before the link 120 is closed. If the updates are to be performed immediately, the communication link 120 will remain open while the updates are retrieved from the server 226 (step 324).

After the update program 224 receives the software information from the handheld computer 20, it either automatically initiates a connection with the Internet or requests the user to connect with the Internet (if the client computer 22 is not already connected). The client computer 22 is connected to the Internet via a TCP/IP connection and an Internet interface program such as a Web browser is activated. The update program 224 transmits a sequence of information packets to the server 226 identifying which software versions it would like updated. The server 226 responds by downloading software updates to the client computer 22. If no versions newer than those already installed on the handheld computer 20 are available, the server 226 sends a message stating this to the client computer 22. The update program 224 may have to contact a plurality of servers 226 to obtain updates for different handheld computer applications. The update program 224 preferably includes a list of Web sites (URLS) to contact for receiving updated versions of handheld computer software. This list may be updated as new applications become available. Alternatively, the update program 224 may contact one Web site which includes links to other sites containing update information. An exemplary process for downloading files from the server 226 to the client computer 22 is described in U.S. patent application Ser. No. 09/001,611, filed Dec. 21, 1997, which is incorporated herein by reference in its entirety.

The update program 224 transmits the software updates to the handheld computer 20 if the handheld computer is still connected to the client computer 22 (step 326). If the handheld computer 20 is not connected to the client computer 22, the client computer stores the software updates in database 222 until the next time it is connected to the handheld computer. A dialog box may be displayed on the client computer 22 to report to the user which handheld applications have been updated. A dialog box may also be displayed to the user after information is transferred from the server 226, to identify the applications for which updates were found, along with the new version numbers, and ask the user which applications he wants updated on his handheld computer 20. After updates are made, the handheld computer 20 is disconnected from the client computer 22.

If additional diagnostics are selected by the user or designated by the central maintenance node 250 to be run, they are performed at steps 328 and 330. These may include, for example, checking for broken shortcuts, missing files, or temporary files that can be deleted, checking the registry area, or deleting games or proprietary information that employees should not have installed on their handheld computer 20. When all of the checks and updates are complete, the system displays a list of the problems detected, along with one or more repair options (step 332). The application then runs the selected fixes and notifies the user which fixes were successful. The problems identified, actions performed, and updates made are stored on the tracking database 272 of the central maintenance node 250 or on the maintenance database 16 of the home maintenance node 22 (step 334).

Instead of the user initiating the maintenance operations, the maintenance may be performed automatically whenever the handheld computer 20 is placed in cradle 24 or a synchronization operation is performed. This allows the central maintenance server 250 to continuously update and maintain all of the employees' handheld computers automatically and collect diagnostics. It is to be understood that the maintenance operations may be performed in a different order than described herein and that any maintenance operation may be run on its own or in combination with other maintenance operations, without departing from the scope of the invention.

It will be observed from the foregoing that the system and method described herein provide numerous advantages. Importantly, the system allows for efficient and secure maintenance of the handheld computer from a location remote from the home maintenance node of the handheld computer. The central maintenance node allows for centralized control of the configuration of a plurality of handheld computers and provides a tracking method for the handheld computers.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for maintaining handheld computers at a location remote from a home maintenance node containing a maintenance database for at least one of the handheld computers and connected to the remote location through a network, the method comprising:

connecting one of the handheld computers to a maintenance node;

detecting whether the maintenance node is the home maintenance node for the handheld computer;

locating the home maintenance node for the handheld computer if the connected maintenance node is not the home maintenance node;

opening a maintenance session between the handheld computer and the home maintenance node; and performing maintenance on the handheld computer;

wherein performing maintenance on the handheld computer involves scanning data on the handheld for viruses;

wherein scanning data on the handheld computer for viruses includes reading said data from the handheld computer, storing said data at least temporarily on a computer system, scanning said data for viruses with a virus detection program, cleaning said data of viruses identified during the scanning, and updating the data on the handheld based on results of the scanning utilizing the virus detection program;

wherein performing maintenance on the handheld computer involves running diagnostics on the handheld computer;

wherein the diagnostics include operations including checking for broken shortcuts, checking for missing files, checking for temporary files that can be deleted, checking a registry area, deleting games, and deleting proprietary information that employees should not have installed on the handheld computer;

wherein the maintenance database contains information on the handheld computer including a personal calendar, contacts, tasks, a list of software and corresponding versions installed on the handheld computer, and a history of diagnostics and repairs for the handheld computer;

wherein a central maintenance node is the home maintenance node for all of the handheld computers;

wherein the central maintenance node includes a central maintenance manager that has access to a tracking database, a rules database, and a download database containing information to be downloaded to the handheld computer;

wherein the tracking database contains problem/action information relating to different problems found and different actions taken on a plurality of the handheld computers, configuration information, and software versions contained on each handheld computer; the rules database defines preferred configurations on the handheld computers and identifies software that should not be installed on the handheld computers; and the download database includes software license information that is downloaded to the handheld computers.

2. The method of claim 1 wherein connecting the handheld computer to the maintenance node comprises connecting a serial line between the handheld computer and a personal computer.

3. The method of claim 2 wherein connecting a serial line comprises placing the handheld computer in a cradle connected to the serial line.

4. The method of claim 1 wherein detecting whether the maintenance node is the home maintenance node comprises comparing an identifier for the handheld computer with an identifier stored in a maintenance database of the home maintenance node.

5. The method of claim 1 wherein locating the home maintenance node for the handheld computer comprises connecting to a network coupled to a plurality of home maintenance nodes.

6. The method of claim 5 wherein the network is an enterprise network.

7. The method of claim 1 wherein locating the home maintenance node for the handheld computer comprises connecting to a network coupled to the central maintenance node containing maintenance databases for each of the handheld computers.

8. The method of claim 1 wherein opening a maintenance session between the handheld computer and the home maintenance node comprises running the central maintenance manager stored on the home maintenance node.

9. The method of claim 8, wherein the maintenance manager performs functions including displaying advertisements and upgrade offers based on applications installed on the handheld computer.

10. The method of claim 1 wherein performing maintenance on the handheld computer comprises synchronizing data stored on the handheld computer with data stored on a maintenance database located in the home maintenance node.

11. The method of claim 1 wherein performing maintenance on the handheld computer comprises updating software installed on the handheld computer.

12. The method of claim 1 wherein performing maintenance on the handheld computer comprises deleting unauthorized software from the handheld computer.

13. The method of claim 1, wherein the central maintenance node includes a user interface which allows a system administrator to configure and update the databases.

14. A system for maintaining a plurality of handheld computers configured for connection to a network having a plurality of maintenance nodes coupled thereto, each of said plurality of handheld computers having a home maintenance node, the system comprising:

for each handheld computer, a maintenance database stored on the home maintenance node and associated with the handheld computer; and a maintenance manager installed on each of the maintenance nodes and operable to detect whether the maintenance node is the home maintenance node for the handheld computer connected to the maintenance node, locate the home maintenance node for the handheld computer if the maintenance node is not the home maintenance node, open a maintenance session across the network between the located home maintenance node and the connected handheld computer, and perform a maintenance operation using the maintenance database stored on the home maintenance node;

wherein performing a maintenance operation on the handheld computer involves scanning data on the handheld for viruses;

wherein scanning data on the handheld computer for viruses includes reading said data from the handheld computer, storing said data at least temporarily on a computer system, scanning said data for viruses with a virus detection program, cleaning said data of viruses identified during the scanning, and updating the data on the handheld based on results of the scanning utilizing the virus detection program;

wherein performing a maintenance operation on the handheld computer involves running diagnostics on the handheld computer;

wherein the diagnostics include operations including checking for broken shortcuts, checking for missing files, checking for temporary files that can be deleted, checking a registry area, deleting games, and deleting proprietary information that employees should not have installed on the handheld computer;

wherein the maintenance database contains information on the handheld computer including a personal calendar, contacts, tasks, a list of software and corresponding versions installed on the handheld computer, and a history of diagnostics and repairs for the handheld computer;

wherein a central maintenance node is the home maintenance node for all of the handheld computers;

wherein the central maintenance node includes a central maintenance manager that has access to a tracking database, a rules database, and a download database containing information to be downloaded to the handheld computer;

wherein the tracking database contains problem/action information relating to different problems found and different actions taken on a plurality of the handheld computers, configuration information, and software versions contained on each handheld computer the rules database defines preferred configurations on the handheld computers and identifies software that should not be installed on the handheld computers; and the download database includes software license information that is downloaded to the handheld computers.

15. The system of claim 5 wherein the central maintenance node is a server.

16. The system of claim 5 wherein the central maintenance node is connected to the Internet.

17. The system of claim 14 wherein the handheld computer is connected to the maintenance node through a high-speed communications interface.

18. The system of claim 17 wherein the handheld computer is connected to the maintenance node through a communication link.

19. The system of claim 18 wherein the serial line is connected to a cradle configured to hold the handheld computer.

20. The system of claim 18, wherein the communication link is selected from the group consisting of a serial line, a dial-up line, a network, and a wireless connection.

21. The system of claim 14 wherein the network is an enterprise network.

22. The system of claim 14 wherein the maintenance manager is configured to synchronize data stored on the handheld computer with data stored on the maintenance database located in the home maintenance node.

23. The system of claim 14 wherein the maintenance manager is configured to update software installed on the handheld computer.

24. The system of claim 14 wherein the maintenance manager is configured to delete unauthorized software from the handheld computer.

25. A computer program product for maintaining handheld computers at a location remote from a home maintenance node containing a maintenance database for at least one of the handheld computers and connected to the remote location through a network, the product comprising:

computer code that creates a communication link between one of the handheld computers and a maintenance node;

computer code that detects whether the maintenance node is the home maintenance node for the handheld computer;

computer code that locates the home maintenance node for the handheld computer if the connected maintenance node is not the home maintenance node;

computer code that opens a maintenance session between the handheld computer and the home maintenance node;

computer code that performs maintenance on the handheld computer; and a computer readable medium that stores said computer codes;

wherein performing maintenance on the handheld computer involves scanning data on the handheld for viruses;

wherein scanning data on the handheld computer for viruses includes reading said data from the handheld computer, storing said data at least temporarily on a computer system, scanning said data for viruses with a virus detection program, cleaning said data of viruses identified during the scanning, and updating the data on the handheld based on results of the scanning utilizing the virus detection program;

wherein performing maintenance on the handheld computer involves running diagnostics on the handheld computer;

wherein the diagnostics include operations including checking for broken shortcuts, checking for missing files, checking for temporary files that, can be deleted, checking a registry area, deleting games, and deleting proprietary information that employees should not have installed on the handheld computer;

wherein the maintenance database contains information on the handheld computer including a personal calendar, contacts, tasks, a list of software and corresponding versions installed on the handheld computer, and a history of diagnostics and repairs for the handheld computer;

wherein a central maintenance node is the home maintenance node for all of the handheld computers;

wherein the central maintenance node includes a central maintenance manager that has access to a tracking database, a rules database, and a download database containing information to be downloaded to the handheld computer;

wherein the tracking database contains problem/action information relating to different problems found and different actions taken on a plurality of the handheld computers, configuration information, and software versions contained an each handheld computer; the rules database defines preferred configurations on the handheld computers and identifies software that should not be installed on the handheld computers, and the download database includes software license information that is downloaded to the handheld computers.

26. The computer product of claim 25 wherein the computer readable medium is selected from the group consisting of CD-ROM, floppy disk, tape, flash memory, system memory, hard drive, and a data signal embodied in a carrier wave.

27. The computer program product of claim 25 further comprising computer code that identifies software installed on the handheld computer, transfers updated versions of the software from a server connected to the network, and updates software installed on the handheld computer.

* * * * *

UNITED STATES PATENT AND TRADEMARK OFFICE
CERTIFICATE OF CORRECTION

PATENT NO. : 6,965,928 B1  Page 1 of 1
APPLICATION NO. : 09/802452
DATED : November 15, 2005
INVENTOR(S) : Cox et al.

It is certified that error appears in the above-identified patent and that said Letters Patent is hereby corrected as shown below:

col. 16, line 9 delete "," after "that";
col. 16, line 30 replace "an" with --on--;
col. 16, line 33 replace "computers," with --computers;--.

Signed and Sealed this

Eighth Day of July, 2008

JON W. DUDAS
*Director of the United States Patent and Trademark Office*